US008086621B2

(12) United States Patent
Gerber

(10) Patent No.: US 8,086,621 B2
(45) Date of Patent: Dec. 27, 2011

(54) SEARCH ENGINE SERVICE UTILIZING THE ADDITION OF NOISE

(75) Inventor: Benjamin S. Gerber, Southfield, MI (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 12/345,996

(22) Filed: Dec. 30, 2008

(65) Prior Publication Data

US 2010/0169294 A1 Jul. 1, 2010

(51) Int. Cl.
*G06F 17/30* (2006.01)
(52) U.S. Cl. .......................................... 707/765
(58) Field of Classification Search .................. 707/765
See application file for complete search history.

(56) References Cited

U.S. PATENT DOCUMENTS

| | | | | |
|---|---|---|---|---|
| 5,790,665 A * | 8/1998 | Micali | ............... | 705/51 |
| 5,855,018 A * | 12/1998 | Chor et al. | ............... | 707/741 |
| 6,023,510 A * | 2/2000 | Epstein | ............... | 705/74 |
| 6,421,675 B1 * | 7/2002 | Ryan et al. | ............. | 707/999.003 |
| 6,745,180 B2 * | 6/2004 | Yamanoue | ............... | 707/734 |
| 7,457,946 B2 * | 11/2008 | Hind et al. | ............... | 713/153 |
| 7,555,474 B2 * | 6/2009 | Byers | ............... | 707/999.003 |
| 7,634,458 B2 * | 12/2009 | Singhal et al. | ......... | 707/999.002 |
| 7,636,714 B1 * | 12/2009 | Lamping et al. | ....... | 707/999.002 |
| 7,693,841 B1 * | 4/2010 | Tesler et al. | ............. | 707/999.01 |
| 7,707,433 B2 * | 4/2010 | Rice et al. | ............... | 713/194 |
| 2002/0038431 A1 | 3/2002 | Chesko et al. | | |
| 2008/0021884 A1 * | 1/2008 | Jones et al. | ............... | 707/3 |
| 2011/0119253 A1 * | 5/2011 | Grabarnik et al. | ........... | 707/722 |

OTHER PUBLICATIONS

Shen et al., Privacy Protection in Personalized Search, Jun. 2007, ACM SIGIR Forum, vol. 41 No. 1, pp. 1-14.*
Saint-Jean et al., Private Web Search, Oct. 2007, ACM, pp. 1-7 (84-90).*
Federrath, Privacy Enhanced Technologies: Methods—Markets—Misuse, 2005, Springer-Verlag Berlin Heidelberg, pp. 1-9.*
"Lostinthecrowd.org Keeps Search Engines Guessing" UNSPAM 2006.
Ahsan Siddiqui "Googleprivacy" CIS Dept., University of Pennsylvania 2008.
Howe et al. "Trackmenot" http://mrl.nyu.edu/~dhowe/TrackMeNot/—website download Jul. 10, 2008.
Schneier on Security. http://www.schneier.com/blog/archives/2006/08/trackmenot_1.html. Aug. 23, 2006.

* cited by examiner

*Primary Examiner* — James Trujillo
*Assistant Examiner* — Jorge A Casanova
(74) *Attorney, Agent, or Firm* — Brown & Michaels, PC

(57) ABSTRACT

A method and modified client that disguises user search terms by adding a plurality of faux search phrases using a phrase-reuse-table comprising resulting faux search phrases and real search phrases the faux search phrases were derived from, a word-reuse-table comprising word substitutions used for words that reveal patterns, and a word-table comprising words that reveal patterns sorted into groups. Faux search phrases are added by looking up the search phrases in the phrase-reuse-table, and looking up the search terms in the word-reuse-table and word-table, suggesting by a predictive search for specific anchor words, recording substitutions for words which reveal patterns in the word-reuse-table, and submitting the search terms and the set of faux search phrases to a search engine. Additionally, additional complexity may be used to generate additional faux search phrases.

16 Claims, 2 Drawing Sheets

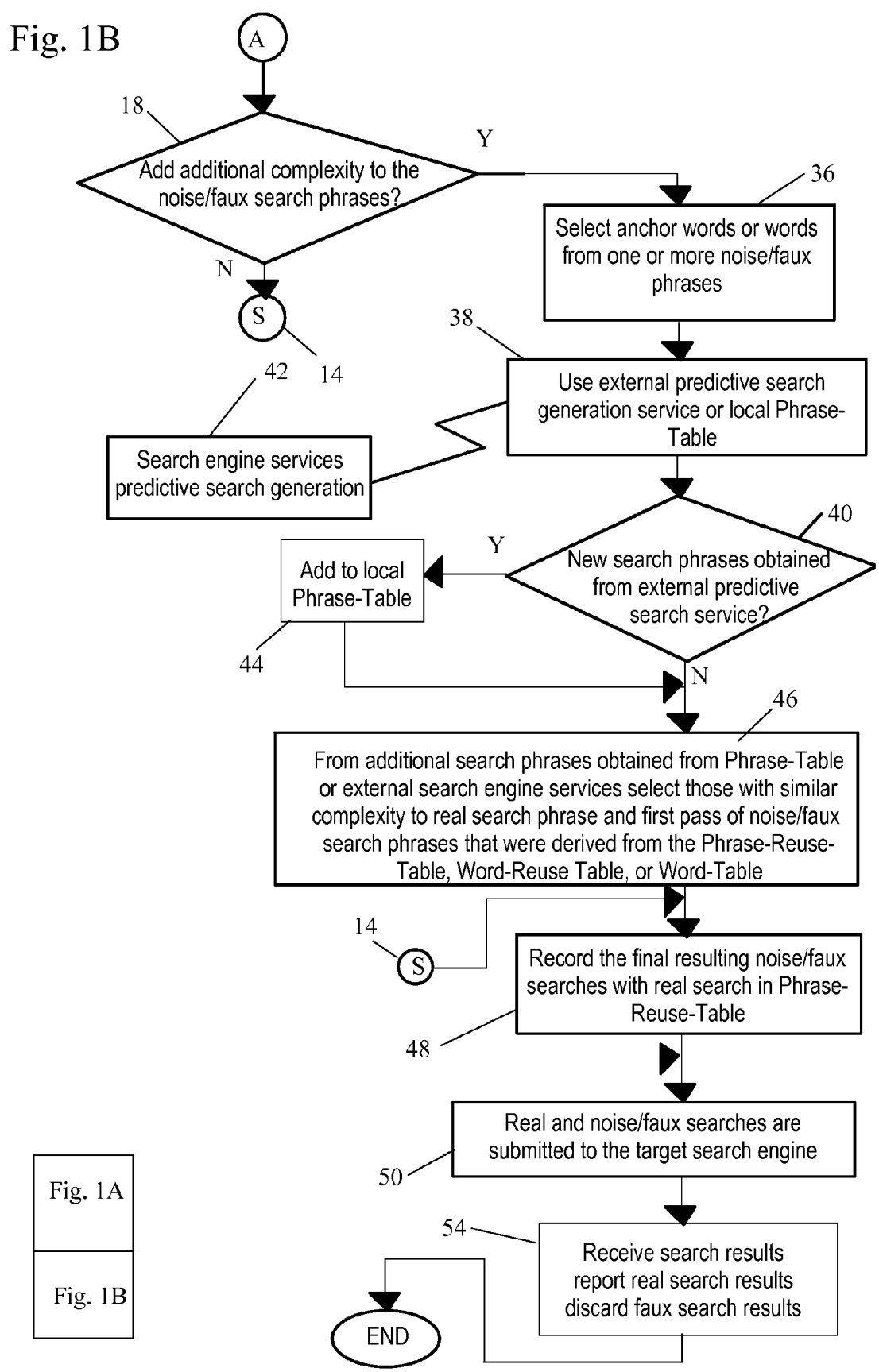

SEARCH ENGINE SERVICE UTILIZING THE ADDITION OF NOISE

BACKGROUND OF THE INVENTION

The present invention relates to search engine services, and more specifically to a search engine service utilizing the addition of noise.

Organizations that operate web search engines acquire a great deal of information about individuals based on the search terms individuals enter into search engines. Search terms reveal individuals everyday activities, business pursuits and personal thoughts. This large scale and very detailed accumulation of individuals' searches leads to a great number of privacy concerns.

Some search engines have decided to make it part of their business strategy to offer anonymous search services. Existing anonymous search engine implantations differ from most search engines in that they do not log search terms and results, or the operating organization only maintains the logs for a minimum period of time. However, with this type of implementation, the organization that operates the search engine still has access to the search terms and results.

SUMMARY OF THE INVENTION

In one embodiment of the present invention, a method of disguising user search terms by adding a plurality of faux search phrases using a phrase-reuse-table comprising resulting faux search phrases and real search phrases the faux search phrases were derived from, a word-reuse-table comprising word substitutions used for words that reveal patterns, and a word-table comprising words that reveal patterns sorted into groups. Faux search phrases are added by selectively looking up the search phrases in the phrase-reuse-table, and the search terms in the word-reuse-table and word-table. If the search phrase is in the phrase-reuse-table a set of faux search phrases associated with the search phrase is retrieved. If the search phrase is not in the phrase-reuse-table, but any of the search terms are in the word-reuse-table, at least one set of faux search phrases using substitutions from the word-reuse-table is created. If the search phrase is not in the phrase-reuse-table and if any search terms are not in the word-reuse-table, but are in the word-table, at least one set of faux search phrases using substitutions from the word-table is created. If the search phrase is not in the phrase-reuse-table and if the search terms are in neither the word-reuse-table nor the word-table, at least one set of faux search phrases may be created using the "additional complexity" feature, that utilizes predictive search technology, described below or if the "additional complexity" feature is not engaged and therefore the real search phrase would not be at least somewhat obfuscated by use of the phrase-reuse-table, word-reuse-table or word-table, a warning message will indicate to the user that none or less than a give number of faux searches will be submitted to the search engine service if the user chooses to proceed with the search. Suggesting by a predictive search for specific anchors words by selecting at least one anchor word from at least one faux search phase in the set of faux search phrases, using the anchor to retrieve at least one additional faux search phrase from the phrase-table; selecting at least one faux search phrase from the additional faux search phrases similar in complexity to the real search phrase and faux search phrases derived from the phrase-reuse-table, word-reuse table, or word-table; and adding the additional faux search phrase to the set of faux search phases. Substitutions for words which reveal patterns determined by the word-table are recorded in the word-reuse-table. Search terms and the set of faux search phrases are submitted to a search engine. Substitutions for words which reveal patterns determined by the word-table are recorded in the word-reuse-table. Search terms and the set of faux search phrases are submitted to a search engine.

In another embodiment of the present invention, a method of disguising user search terms and search phrases by adding a plurality of faux search phrases using a phrase-reuse-table comprising resulting faux search phrases and real search phrases the faux search phrases were derived from, a word-reuse-table comprising word substitutions used for words that reveal patterns, and a word-table comprising words that reveal patterns sorted into groups. Faux search phrases are added by selectively looking up the search phrases in the phrase-reuse-table, and looking up the search terms in the word-reuse-table and word-table, and if the search phrases are in the phrase-reuse-table, retrieving a set of faux search phrases associated with the search phrase. If the search phrases are not in the phrase-reuse-table, but any search terms are in the word-reuse-table, creating at least one set of faux search phrases using substitutions from the word-reuse table. If the search phrase is not in the phrase-reuse-table, and at least one search term is not in the word-reuse-table, but are in the word-table, creating at least one set of faux search phrases using substitutions from the word-table. Suggesting by a predictive search for specific anchor words by selecting at least one anchor word from at least one faux search phrase in the set of faux search phrases; using the anchor word, retrieving at least one additional faux search phrase from an external search engine predictive search generator; adding the additional faux search phrase to the phrase-table; selecting at least one faux search phrase from the additional faux search phrases similar in complexity to the real search phrase and faux search phrases derived from the phrase-reuse-table, word-reuse-table or word-table; and adding the additional faux search phrase to the set of faux search phrases. Recording substitutions for words which reveal patterns in the word-reuse-table are recorded and the search terms and the set of faux search phrases are submitted to a search engine.

In another embodiment of the present invention, a modified client for disguising user search terms by adding a plurality of faux search phrases comprising: a processor coupled to memory; a phrase-reuse-table, comprising: resulting faux search phrases and real search phrases the faux search phrases were derived from; a word-reuse-table, comprising: word substitutions used for words that reveal patterns; and a word-table, comprising: words that reveal patterns sorted into groups. The modified client operates by selectively looking up the search phrases in the phrase-reuse table, and looking up the search terms in the word-reuse-table and word-table, and if the search phrases are in the phrase-reuse-table, retrieving a set of faux search phrases associated with the search phrase. If the search phrases are not in the phrase-reuse-table, but any search terms are in the word-reuse-table, creating at least one set of faux search phrases using substitutions from the word-reuse-table. If the search terms are not in the phrase-reuse-table and at least one search term is not in the word-reuse-table, but are in the word-table, creating at least one set of faux search phrases using substitutions from the word-table. Suggesting by a predictive search for specific anchor words, by selecting at least one anchor word from at least one faux search phrase in the set of faux search phrases; using the anchor, retrieving at least one additional faux search phrase from the phrase-table; selecting at least one faux search phrase from the additional faux search phrases similar in complexity to the real search phrase and faux search phrases derived from the phrase-reuse-table, word-reuse-table or word-table; and adding the additional faux search phrase to the set of faux search phrases. Substitutions for words which reveal patterns in the word-reuse- table are recorded and the search terms and the set of faux search phrases are submitted to a search engine.

In another embodiment of the present invention, a modified client for disguising user search terms by adding a plurality of faux search phrases comprising: a processor coupled to memory: a phrase-reuse-table, comprising: resulting faux search phrases and real search phrases the faux search phrases were derived from; a word-reuse-table, comprising: word substitutions used for words that reveal patterns; and a word-table, comprising: words that reveal patterns sorted into groups. The modified client operates by selectively looking up the search phrases in the phrase-reuse table, and looking up the search terms in the word-reuse-table and word-table, and if the search phrases are in the phrase-reuse-table, retrieving a set of faux search phrases associated with the search phrase. If the search phrases are not in the phrase-reuse-table, but any search terms are in the word-reuse-table, creating at least one set of faux search phrases using substitutions from the word-reuse-table. If the search terms are not in the phrase-reuse-table and at least one search term is not in the word-reuse-table, but are in the word-table, creating at least one set of faux search phrases using substitutions from the word-table. Suggesting by a predictive search for specific anchor words, by selecting at least one anchor word from at least one faux search phrase in the set of faux search phrases; using the anchor word, retrieving at least one additional faux search phrase from an external search engine predictive search generator; adding the additional faux search phrase to the phrase-table; selecting at least one faux search phrase from the additional faux search phrases similar in complexity to the real search phrase and faux search phrases derived from the phrase-reuse-table, word-reuse-table or word-table; and adding the additional faux search phrase to the set of faux search phrases. Substitutions for words which reveal patterns in the word-reuse table are recorded and the search terms and the set of faux search phrases are submitted to a search engine.

BRIEF DESCRIPTION OF THE SEVERAL VIEWS OF THE DRAWINGS

FIGS. 1A and 1B shows a method of using a search engine utilizing the addition of noise or faux searches.

DETAILED DESCRIPTION OF THE INVENTION

Figure 1A:
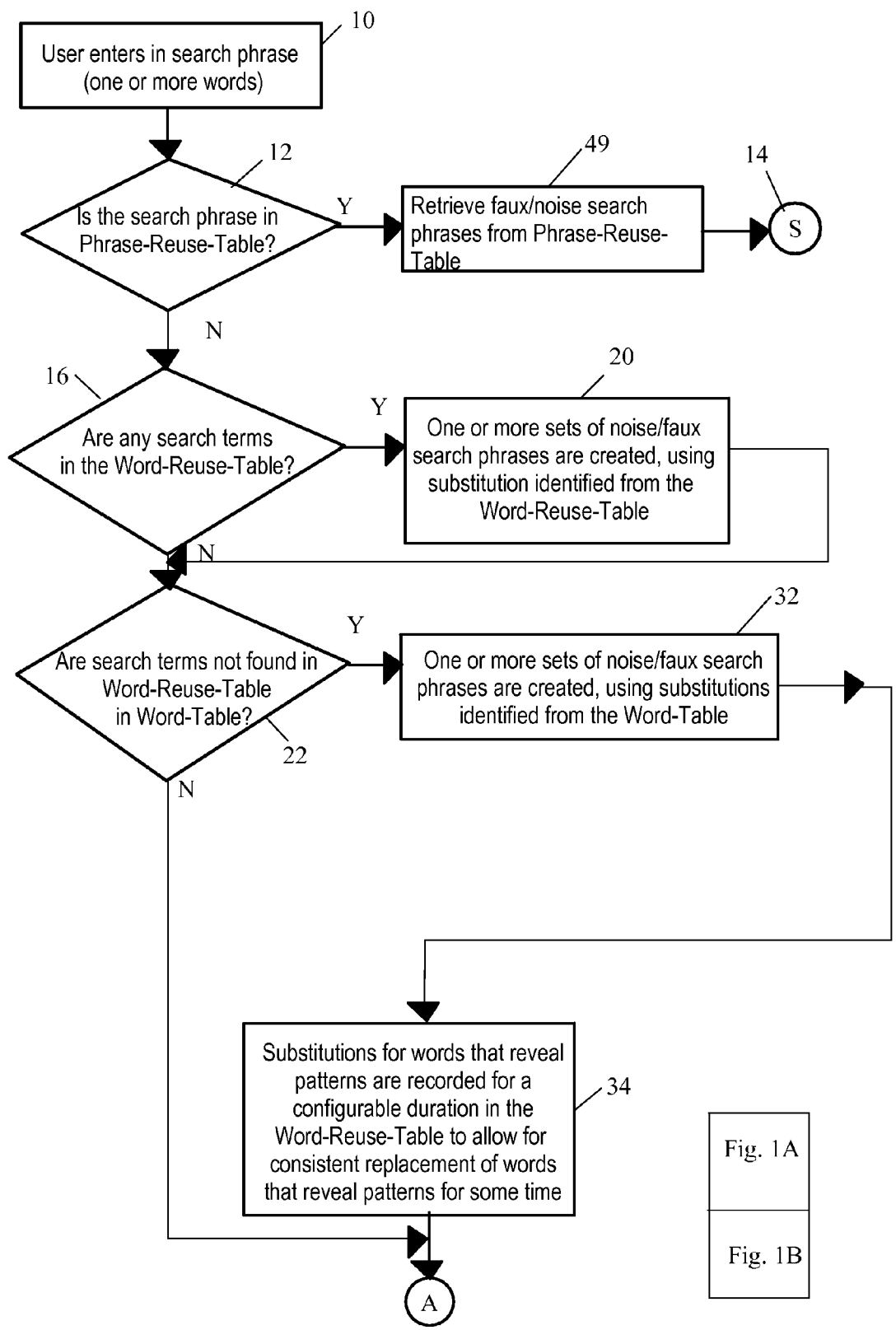

By adding noise to avoid pattern detection and or profiling of search terms, the operator of the search engine will not know what the end users' or service consumers real search terms are. Real search terms are still submitted to the search engine, however the noise prevents the search engine organization from developing an accurate profile or detecting accurate patterns of users' interests, activities, etc.

A modified client, such as a web browser with an "add-on" or "plug-in" can submit multiple intelligently generated search words and phrases along with a user's real search terms in a random order when a user executes a search using a search engine. The generated search terms can be random, follow the same grammar pattern, along the lines of the same broad subject area, be in entirely unrelated terms, or follow another pattern that buries the real search terms in noise. The operator of the search engine therefore does not know what the users' real search terms are.

Each noise search submission is a separate request submitted by the client to the server, for example HTTP POST Request, than the request submitted with the real search terms. Each request then results in a distinct response, for example HTTP response, from the server.

The modified client keeps track of which search submission is the real one and only displays the results of the real search to the user. The user does not need to determine which result sets are for the real search submission versus the noise search submission. Any number of noise search submissions could be submitted to the server by the modified client for every real search submission.

The modified client may identify when to use "noise" words in a similar context to the "real" words by utilizing a table that identifies when a word fits the class of words that can reveal a pattern if not substituted with similar words, rather than random words (e.g. names of places, or persons, numerals). The words grouped by similarity can also then be used for substitution into the noise searches.

To produce very realistic "noise" search phrases predictive search suggestions from existing search engine implementations can be leveraged. Predictive search terms can be drawn from one search engine and used as noise search phrases of a different search engine. Since predictive search phrases are based on actual searches performed by other persons or indexed result sets, utilizing search phrases recommended by predictive searches reflect real world searches.

The present invention does not implement predictive search, it leverages existing predictive search technology to implement enhanced privacy for users' searches.

Referring to FIGS. 1A and 1B, a user enters 10 a search phrase consisting of one or more search terms. The search terms entered are compared 12 to a Phrase-Reuse-Table 24 to determine if they are present. The Phrase-Reuse-Table 24 contains the final resulting noise/faux search phrases along with the real search phrase they were derived from. If the same or very similar real search is repeated, the same set of noise/faux search phrases will be reused. An example of a Phrase-Reuse-Table 24 is shown below.

If the search phrase is present 12 in the Phrase-Reuse-Table 24, faux/noise search phrases are retrieved 49 from the Phrase-Reuse-Table 24. Then through S 14, the real and noise/faux searches are submitted 50 to the target search engine. The final resulting noise/faux search phrases and the real search may be recorded 48 in the Phrase-Reuse-Table prior to submitting 50 the noise/faux search and the real search to the target search engine.

If the search phrase is not present 12 in the Phrase-Reuse-Table 24, then the search terms are compared 16 to a Word-Reuse-Table 26. The Word-Reuse-Table 26 contains word substitutions recently used for words that reveal patterns to allow for consistent replacement of words that reveal patterns for some time. An example of a Word-Reuse-Table 26 is shown below.

If any search terms are present 16 in the Word-Reuse-Table 26, one or more sets of noise/faux search phrases are created 20 using substitution identified from the Word-Reuse-Table 26.

If any search terms are not present 16 in the Word-Reuse-Table 26, then the search terms are compared 22 to the Word-Table 28. The Word-Table 28 contains words that reveal patterns sorted in to groups. The Word-Table consists of words that reveal a pattern of the user's thoughts, actions, etc. sorted into groups. Words may belong to more than one related or unrelated group. The Word-Table could be updated by an advanced user or automatically from a central source (e.g. the software publisher). Automatic updates could be distributed much the same as anti-virus software updates are.

Words that reveal a pattern would include all nouns, verbs, and may be adjectives and adverbs and some conjunctions in a given language's dictionary. Additionally specialized words could be added from domain-specific dictionaries (e.g. medical dictionary) and many proper nouns could be added from trademark databases and/or various publications. An example of a Word-Table 28 is shown below.

If the search terms are present 22 in the Word-Table 28, one or more sets of noise/faux search phrases are created 32 using substitutions identified from the Word-Table 28. After the noise/faux search phrases are created, substitutions for terms that reveal patterns derived from the Word-Table 28 are recorded 34 for a configurable duration in the Word-Reuse-Table 26 to allow for consistent replacement of words that reveal patterns for some time.

If additional complexity 18 is not engaged and therefore the real search phrase would not be at least somewhat obfuscated by use of the Phrase-Reuse-Table 24, Word-Reuse-Table 26 or Word-Table 28, a warning message will indicate to the user that none or less than a give number of faux searches will be submitted to the search engine service if the user chooses to proceed with the search. Substitutions for words which reveal patterns determined by the Word-Table 28 are recorded in the Word-Reuse-Table 26.

If additional complexity 18 to the noise/faux search phrases is desired, anchor word or words from one or more noise/faux phrases are selected 36. The anchor words are used to identify very realistic search phrases from the predictive search generation. External predictive search generation services 42 or a local Phrase-Table 52 are used 38 to generate additional search phrases. If new search phrases are obtained 40 from the external predictive search engine, the new search phrases are added 44 to the local Phrase-Table 52. The Phrase-Table 52 contains phrases suggested by predictive search for specific anchor words. An example of a Phrase-Table 52 is shown below.

From the search phrases obtained 40 from the Phrase-Table 52 or external predictive search service 42, those with with similar complexity to the real search phrase and first pass of noise/faux search phrases are selected 46.

The final resulting noise/faux searches along with the real search are recorded 48 so that if the same or very similar real search phrase is repeated, the same set of noise/faux searches will be reused. Then the real and noise/faux searches are submitted 50 to the target search engine. The modified client receives the real and faux search results and reports 54 the real search results and the faux search results are discarded.

EXAMPLES

For the purposes of the following examples, we assume the system starts with the tables containing data as follows:

Phrase-Reuse-Table

| Phrase | Faux Searches |
|---|---|
| Detroit Tigers | Boston Red Sox, Seattle Mariners, Buffalo Bills, Brooklyn Dodgers, Washington Senators, San Jose Sharks . . . |
| Dodge Viper | Honda Rattler, Ford Thunderbird, Toyota Prius, Jeep Wrangler, BMW motorcycle, Mountain bike . . . |
| Boston hotels | New York aquariums, Washington museums, London B&B's, Miami sponge docks, LA boardinghouse . . . |

Phrase-Reuse-Table (continued)

| Phrase | Faux Searches |
|---|---|
| Macintosh virus protection | Unix intrusion detection, Fuji film, Crispin valves . . . |
| . . . | . . . |

Word-Reuse-Table

| Word | Word Substitution |
|---|---|
| Detroit | Pittsburgh, Seattle, Ithaca, Endicott, Cortland, Homer . . . |
| Dodge | Honda, Ford, Toyota, Jeep, BMW . . . |
| Boston | New York, Washington, London, Miami, LA |
| Macintosh | Cortland, Fuji, Crisipin, Golden Delicious, Granny Smith . . . |
| Tiger | Lion, cat, dog, ferret, eagle, mongoose, bird, ocelot, harrier, bear . . . |
| Hotel | Aquarium, . . . |
| . . . | |

Word-Table

| Group | Words |
|---|---|
| Predators | Lion, ferret, eagle, mongoose, eagle, ocelot, harrier, bear, tiger . . . |
| Animal related objects or nouns | Pets, cage, house, toy, postage stamps, photographs, socks, babies |
| Cars | Honda, Ford, Toyota, Jeep, BMW, Dodge, Chrysler . . . |
| Major Cities | Boston, New York, Washington, London, Miami, LA, Edinburgh . . . |
| Apples | Macintosh, Cortland, Fuji, Crisipin, Golden Delicious, Granny Smith . . . |
| Colors | Black, brown, red, orange, yellow, green, blue, violet, grey, white . . . |
| Tourist | Hotel, B&B, aquarium, stadium, museum, amusement park . . . |
| . . . | |

Phrase-Table

| Anchor Word | Phrase |
|---|---|
| Detroit | Detroit news, Detroit tigers, Detroit free press, Detroit pistons, etc . . . |
| Viper | Viper room, Viper alarm, Viper snakes, etc . . . |
| Hotels | Las Vegas hotels, Hilton hotels, cheap hotels, etc . . . |
| Macintosh | Macintosh computers, Macintosh software, Macintosh apple recipes etc . . . |
| White | White fences, White houses, White dogs, White pages, White Soxs, White appliances etc . . . |
| . . . | . . . |

Example 1

A user enters 10 in the search terms "Dodge Viper". The search phrase of "Dodge Viper" is compared 12 to the Phrase-Reuse-Table 24 given as an example above. The search terms are present in the Phrase-Reuse-Table 24, and the real search of "Dodge Viper" and the noise/faux searches of "Honda Rattler, Ford Thunderbird, Toyota Prius, Jeep Wrangler" are individually submitted 50 to the target search engine. The real search results and faux search results are received and the real search results are reported 54 and the faux search results are discarded.

Example 2

A user enters 10 in the search terms of "tiger pets". The search phrase of "tiger pets" is compared 12 to the Phrase-Reuse-Table 24 given as an example above. The search phrase is not present in the Phrase-Reuse-Table 24. The search terms of "tiger" and "pets" are then compared 16 to the Word-Reuse-Table 26. The search term "Tiger" is present in the Word-Reuse-Table 26 shown above as an example and one or more sets of noise/faux search phrases are created 20 using the substitution identified from the Word-Reuse-Table 26. Examples of the noise/faux search phrases created using the Word-Reuse-Table 26 are "lion pets," "cat pets," "dog pets," "mongoose pets," "bird pets" etc. . . . Substitutions for words that reveal patterns are recorded 34 for a configurable duration in the Word-Reuse-Table 26 to allow for consistent replacement of words that reveal patterns. The search term "pets" is then compared 22 to the Word-Table 28. The search term "pets" is present in the Word-Table 28 shown above as an example and one or more sets of noise/faux search phrases are created 32 using the substitution identified from the Word-Table 28. Examples of the noise/faux search phrases created using the Word-Table 28 are "lion cage", "cat toy", "tiger postage stamps", "mongoose photographs", "bird babies", etc. . . . Substitutions for words that reveal patterns are recorded 34 for a configurable duration in the Word-Reuse-Table 26 to allow for consistent replacement of words that reveal patterns. An example of an entry made in the Word-Reuse-Table indexed by "pets" would be the words "cage, toy, postage stamps, photographs, babies" etc. . . .

Additional complexity 18 was determined to be not necessary for the noise/faux search phrase. The final resulting noise/faux search phrase and the real search phrase are recorded 48 in the Phrase-Reuse-Table 24. The real and noise/faux searches are submitted 50 to the target search engine. The real search results and faux search results are received and the real search results are reported 54 and the faux search results are discarded.

Example 3

A user enters 10 in the search terms of "white kitchen cabinets". The search phrase of "white kitchen cabinets" is compared 12 to the Phrase-Reuse-Table 24 given as an example above. The search phrase is not present in the Phrase-Reuse-Table 24. The search terms "white", "kitchen", and "cabinets" are then compared 16 to the Word-Reuse-Table 26. The search terms are not present in the Word-Reuse-Table 26. The search terms are then compared 22 to the Word-Table 28. The word "white" of the search phrase "white kitchen cabinets" is found in the Word-Table 28 as given in the example above. One or more sets of noise/faux search phrases are created using substitutions identified from the Word-Table 28, such as "Yellow kitchen cabinets," "blue kitchen cabinets," "black kitchen cabinets," etc. After the noise/faux search phrases are created 32, substitutions for words that reveal patterns are recorded 34 for a configurable duration in the Word-Reuse-Table 26 to allow for consistent replacement of words that reveal patterns for some time.

Additional complexity was determined 18 to be necessary for the noise/faux search phrase, and anchor words or words from one or more noise/faux phrases are selected 36. In this example, "white" was selected as an anchor word form a local Phrase-Table 52. New search phrases were not obtained 40 from an external predictive search service. From the predictive search phrases from the local Phrase-Table 52 of "White fences," "White houses," "White dogs," "White pages," "White Soxs", "White appliances", the search phases with similar complexity to the real search phrase and first pass of noise/faux search phrases are selected 46. The final resulting noise/faux searches and the real search phrase is recorded 48 in the Phrase-Reuse-Table 24. The final resulting noise/faux searches and the real search are submitted 50 to the target search engine. The real search results and faux search results are received and the real search results are reported 54 and the faux search results are discarded.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of disguising user search terms and search phrases by adding a plurality of faux search phrases using a phrase-reuse-table comprising resulting faux search phrases and real search phrases the faux search phrases were derived from, word-reuse-table comprising word substitutions used for words that reveal patterns, and a word-table comprising words that reveal patterns sorted into groups, comprising:
   a) selectively looking up the search phrases in the phrase-reuse-table, and looking up the search terms in the word-reuse-table and word-table, and
      if the search phrases is in the phrase-reuse-table, retrieving a set of faux search phrases associated with the search phrase;
      if the search phrases is not in the phrase-reuse-table, but any search terms are in the word-reuse-table, creating at least one set of faux search phrases using substitutions from the word-reuse-table;
      if the search phrase is not in the phrase-reuse-table and at least one search term is not in the word-reuse-table, but are in the word-table, creating at least one set of faux search phrases using substitutions from the word-table;
   b) suggesting by a predictive search for specific anchor words, comprising:
      selecting at least one anchor word from at least one faux search phrase in the set of faux search phrases;
      using the anchor word, retrieving at least one additional faux search phrase from the phrase-table;
      selecting at least one faux search phrase from the additional faux search phrases similar in complexity to the real search phrase and faux search phrases derived from the phrase-reuse-table, word-reuse-table or word-table; and
      adding the additional faux search phrase to the set of faux search phrases;
   c) recording substitutions for words which reveal patterns in the word-reuse-table; and
   d) submitting the search terms and the set of faux search phrases to a search engine.

2. The method of claim 1, further comprising recording the search phrase and the set of faux search phrases in the phrase-reuse-table.

3. The method of claim 2, in which the recording is performed prior to submitting the search phrase and the set of faux search phrases to the search engine.

4. The method of claim 1, further comprising receiving real search results and faux search results from the search engine, reporting the real search results to the user and discarding the faux search results.

5. A method of disguising user search terms and search phrases by adding a plurality of faux search phrases using a phrase-reuse-table comprising resulting faux search phrases and real search phrases the faux search phrases were derived from, word-reuse-table comprising word substitutions used for words that reveal patterns, and a word-table comprising words that reveal patterns sorted into groups, comprising:
 a) selectively looking up the search phrases in the phrase-reuse-table, and looking up the search terms in the word-reuse-table and word-table, and
  if the search phrases is in the phrase-reuse-table, retrieving a set of faux search phrases associated with the search phrase;
  if the search phrases is not in the phrase-reuse-table, but any search terms are in the word-reuse-table, creating at least one set of faux search phrases using substitutions from the word-reuse table;
  if the search phrase is not in the phrase-reuse-table, and at least one search term is not in the word-reuse-table, but are in the word-table, creating at least one set of faux search phrases using substitutions from the word-table;
 b) suggesting by a predictive search for specific anchor words, comprising:
  selecting at least one anchor word from at least one faux search phrase in the set of faux search phrases;
  using the anchor word, retrieving at least one additional faux search phrase from an external search engine predictive search generator;
  adding the additional faux search phrase to the phrase-table;
  selecting at least one faux search phrase from the additional faux search phrases similar in complexity to the real search phrase and faux search phrases derived from the phrase-reuse-table, word-reuse-table or word-table; and
  adding the additional faux search phrase to the set of faux search phrases;
 c) recording substitutions for words which reveal patterns in the word-reuse-table; and
 d) submitting the search terms and the set of faux search phrases to a search engine.

6. The method of claim 5, further comprising recording the search phrase and the set of faux search phrases in the phrase-reuse-table.

7. The method of claim 6, in which the recording is performed prior to submitting the search phrase and the set of faux search phrases to the search engine.

8. The method of claim 5, further comprising receiving real search results and faux search results from the search engine, reporting the real search results to the user and discarding the faux search results.

9. A modified client for disguising user search terms by adding a plurality of faux search phrases comprising:
 a) a processor coupled to memory;
 b) a phrase-reuse-table, comprising: resulting faux search phrases and real search phrases the faux search phrases were derived from;
 c) a word-reuse-table, comprising: word substitutions used for words that reveal patterns; and
 d) a word-table, comprising: words that reveal patterns sorted into groups; in which the modified client operates by:
  i) selectively looking up the search phrases in the phrase-reuse table, and looking up the search terms in the word-reuse-table and word-table, and
   if the search phrases are in the phrase-reuse-table, retrieving a set of faux search phrases associated with the search phrase;
   if the search phrases are not in the phrase-reuse-table, but any search terms are in the word-reuse-table, creating at least one set of faux search phrases using substitutions from the word-reuse-table;
   if the search terms are not in the phrase-reuse-table and at least one search term is not in the word-reuse-table, but are in the word-table, creating at least one set of faux search phrases using substitutions from the word-table;
  ii) suggesting by a predictive search for specific anchor words, comprising:
   selecting at least one anchor word from at least one faux search phrase in the set of faux search phrases;
   using the anchor, retrieving at least one additional faux search phrase from the phrase-table;
   selecting at least one faux search phrase from the additional faux search phrases similar in complexity to the real search phrase and faux search phrases derived from the phrase-reuse-table, word-reuse-table or word-table; and
   adding the additional faux search phrase to the set of faux search phrases
  iii) recording substitutions for words which reveal patterns in the word-reuse-table; and
  iv) submitting the search terms and the set of faux search phrases to a search engine.

10. The client of claim 9, further comprising recording the search phrase and the set of faux search phrases in the phrase-reuse-table.

11. The client of claim 10, in which the recording is performed prior to submitting the search phrase and the set of faux search phrases to the search engine.

12. The client of claim 9, further comprising receiving real search results and faux search results from the search engine, reporting the real search results to the user and discarding the faux search results.

13. A modified for disguising user search terms by adding a plurality of faux search phrases comprising:
 a) a processor coupled to memory:
 b) a phrase-reuse-table, comprising: resulting faux search phrases and real search phrases the faux search phrases were derived from;
 c) a word-reuse-table, comprising: word substitutions used for words that reveal patterns; and
 d) a word-table, comprising: words that reveal patterns sorted into groups; in which the modified client operates by:
  i) selectively looking up the search phrases in the phrase-reuse table, and looking up the search terms in the word-reuse-table and word-table, and
   if the search phrases are in the phrase-reuse-table, retrieving a set of faux search phrases associated with the search phrase;
   if the search phrases are not in the phrase-reuse-table, but any search terms are in the word-reuse-table, creating at least one set of faux search phrases using substitutions from the word-reuse-table;

if the search terms are not in the phrase-reuse-table and at least one search terms is not in the word-reuse-table, but are in the word-table, creating at least one set of faux search phrases using substitutions from the word-table;

ii) suggesting by a predictive search for specific anchor words, comprising:

selecting at least one anchor word from at least one faux search phrase in the set of faux search phrases;

using the anchor word, retrieving at least one additional faux search phrase from an external search engine predictive search generator;

adding the additional faux search phrase to the phrase-table;

selecting at least one faux search phrase from the additional faux search phrases similar in complexity to the real search phrase and faux search phrases derived from the phrase-reuse-table, word-reuse-table or word-table; and adding the additional faux search phrase to the set of faux search phrases iii) recording substitutions for words which reveal patterns in the word-reuse table; and iv) submitting the search terms and the set of faux search phrases to a search engine.

14. The modified client of claim 13, further comprising recording the search phrase and the set of faux search phrases in the phrase-reuse-table.

15. The modified client of claim 14, in which the recording is performed prior to submitting the search phrase and the set of faux search phrases to the search engine.

16. The client of claim 13, further comprising receiving real search results and faux search results from the search engine, reporting the real search results to the user and discarding the faux search results.

* * * * *